(12) United States Patent
Bossolo et al.

(10) Patent No.: US 11,124,640 B2
(45) Date of Patent: Sep. 21, 2021

(54) FLUOROELASTOMER COMPOSITION

(71) Applicant: SOLVAY SPECIALTY POLYMERS ITALY S.P.A., Bollate (IT)

(72) Inventors: Stefano Bossolo, Parabiago (IT); Marco Avataneo, Milan (IT); Stefano Millefanti, Tradate (IT); Michael J. Cox, Mesa, AZ (US)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 170 days.

(21) Appl. No.: 16/499,864

(22) PCT Filed: Mar. 23, 2018

(86) PCT No.: PCT/EP2018/057457
§ 371 (c)(1),
(2) Date: Sep. 30, 2019

(87) PCT Pub. No.: WO2018/177934
PCT Pub. Date: Oct. 4, 2018

(65) Prior Publication Data
US 2020/0109273 A1    Apr. 9, 2020

(30) Foreign Application Priority Data

Mar. 31, 2017 (EP) .................................. 17164042

(51) Int. Cl.
| | |
|---|---|
| *C08L 27/18* | (2006.01) |
| *C08K 5/03* | (2006.01) |
| *C08K 5/136* | (2006.01) |
| *C08K 5/28* | (2006.01) |
| *C08K 5/17* | (2006.01) |
| *C08K 5/205* | (2006.01) |
| *C08K 5/21* | (2006.01) |

(52) U.S. Cl.
CPC .............. *C08L 27/18* (2013.01); *C08K 5/136* (2013.01); *C08K 5/28* (2013.01); *C08K 5/03* (2013.01); *C08K 5/17* (2013.01); *C08K 5/205* (2013.01); *C08K 5/21* (2013.01)

(58) Field of Classification Search
CPC . C08K 5/03; C08K 5/136; C08K 5/17; C08K 5/28; C08L 27/18
See application file for complete search history.

(56) References Cited

U.S. PATENT DOCUMENTS

| | | | |
|---|---|---|---|
| 4,281,092 A | 7/1981 | Breazeale | |
| 4,943,622 A * | 7/1990 | Naraki | C08F 214/18 526/206 |
| 5,447,993 A | 9/1995 | Logothetis | |
| 5,789,489 A | 8/1998 | Coughlin et al. | |
| 6,465,576 B1 | 10/2002 | Grootaert et al. | |
| 2012/0017674 A1 | 1/2012 | Kumar | |

FOREIGN PATENT DOCUMENTS

WO    95/02634 A1    1/1995

OTHER PUBLICATIONS

Reich U., Smart Seals—Seal, Feel, Act, Press release, Apr. 25, 2016, (https://www.fst.com/press/2016/freudenberg-smart-seals).

\* cited by examiner

*Primary Examiner* — Vickey Nerangis
(74) *Attorney, Agent, or Firm* — Osha Bergman Watanabe & Burton LLP

(57) ABSTRACT

The invention pertains to a composition based on a fluoroelastomer comprising nitrile or carboxylate-type cure sites and including a curing agent and a Br-containing marker having reactivity towards the said cure-sites, which can be cured so as to deliver cured parts maintaining chemically bound bromine atoms; this material, when submitted to wear/damage would hence release Br-containing contaminants, which can easily spotted via notably an on-line mass spectrometer, so as to monitor and anticipate critical failures of sealing materials based there upon.

19 Claims, No Drawings

FLUOROELASTOMER COMPOSITION

CROSS-REFERENCE TO RELATED APPLICATION

This application is a U.S. national stage entry under 35 U.S.C. § 371 of International Application No. PCT/EP2018/057457 filed Mar. 23, 2018, which claims priority to European application No. 17164042.8, filed on Mar. 31, 2017. The entire contents of these applications are explicitly incorporated herein by this reference.

TECHNICAL FIELD

The invention pertains to a fluoroelastomer composition able to provide for cured parts having ability to interact with specific sensors in case of wear or damage, to a method of curing the same and to cured articles obtained therefrom, which are notably useful as smart seals.

BACKGROUND ART

Fluoroelastomers, and more specifically perfluoroelastomers, have long been used in a variety of applications that require excellent resistance to several rash conditions, including high temperature, chemical attack, and exposure to plasma, including in particular in the semi-conductors' manufacturing industry. Especially in this area, the possibility of monitoring wear and damages which may be incurred in sealing parts is an essential requirement for optimizing production, and avoiding wastes of manufactured semi-conductor goods out-of-spec because of undesirable contaminants or non-adapted manufacturing conditions.

Indeed, seals are mostly made of fluoroelastomers, which, in their pure form, cannot process signals and/or deliver signals. Several initiatives are being taken for investigating materials that make it possible to use seals as sensors or able to interact with sensors under specific conditions, without comprising the seal's original task.

One of the main challenge is to provide a seal able to recognize how worn it is, for instance. This self-monitoring is also known as "condition monitoring."

One exemplary solution has been described notably by Freudenberg (see press release dated Apr. 25, 2016, available in web-page: https://www.fst.com/press/2016/freudenberg-smart-seals, downloaded on Mar. 10, 2017); according to this document, a rod seal composed of a conductive elastomer including effective amount of conductive filler material and an insulating outer layer is provided, whereas the outer layer is the sealing lip in the seal. When an electrical circuit connects the rod and the housing wall, electricity can become a measurable variable. As the rod seal moves back and forth, the sealing lip abrades. If the conductive base material reaches the surface, the electrical circuit between the rod and the housing closes—a condition that a LED could signal.

Nevertheless, this solution requires the use of peripheral's (electric circuit) in direct contact with the seal to be monitored, which may be an impracticable solution in several assemblies.

In this area, there remains hence a continuous quest for curable fluoroelastomer compositions able to deliver cured parts expressing condition monitoring towards wear/structural damages, maintaining manufacturing costs at reasonable level, and without impairing primary role of the seal.

SUMMARY OF INVENTION

A first object of the invention is hence a fluoroelastomer composition [composition (C)] comprising:

- at least one fluoroelastomer [fluoroelastomer (A)] comprising from 0.1 to 10.0% moles, with respect to total moles of recurring units of fluoroelastomer (A), of recurring units derived from at least one of:
  - cure-site containing monomers having at least a nitrile group [monomer (CS—N)];
  - cure-site containing monomers having at least a carbo-group [monomer (CS—C)] selected from the group consisting of carboxylic groups —COOH; carboxylate groups —COOX$_a$, with X$_a$ being a monovalent metal or an ammonium group; carboxamide group —CONH$_2$; and alkoxycarboxylic group —COO—R$_H$, with R$_H$ being a (fluoro)(hydro)carbon group, preferably a C$_1$-C$_3$ alkyl group;
- at least one curing agent [agent (A)];
- at least one bromine-containing marker [marker (B)], selected from the group consisting of compounds comprising at least one Br atom and at least one group selected from:
  - (B-1) aromatic ortho-diamine groups;
  - (B-2) aromatic ortho amino-(thio)phenolic-type groups;
  - (B-3) amidoxime/amidine/amidrazone groups of formula:

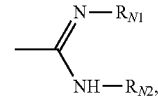

wherein R$_{N1}$ is —OH or —H, and R$_{N2}$ is H or NH$_2$, and
  - (B-4) imidoylamidine groups of formula:

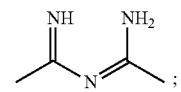

- (B-5) azide groups of formula:

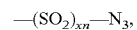

whereas xn is 0 or 1;
  - (B-6) carbazide groups of formula

wherein J$^N$ is either a bond, an ester oxygen —O— group, or an amine —NH— group.

The Applicant has surprisingly found that when combining the afore-mentioned curable compound, including a fluoroelastomer comprising nitrile cure sites, a curing system for the same, and a Br-containing reactive marker, this compound can be cured so as to deliver cured parts maintaining chemically bound bromine atoms: this material, when submitted to wear/damage would hence release Br-containing contaminants, which are solely originating from seals' damages as bromine atoms are generally absolutely not comprised in semi-conductors raw materials or final parts, and which can easily spotted via notably an on-line mass spectrometer, such as those which are routinely connected to semi-conductors' manufacture.

DETAILED DESCRIPTION OF THE INVENTION

The composition (C) comprises one or more than one agent (A), as above detailed.

The said agent (A) is an agent able to promote the cross-linking of the fluoroelastomer (A) through reaction with the cure sites of monomers (CS—N) and/or (CS—C), as above described. The agent (A) may be notably a compound possessing a plurality of groups having reactivity towards the nitrile- and/or the carbo-groups of monomers (CS—N) and/or (CS—C), as above described, and/or can be a compound activating catalytically the same nitrile- and/or the carbo-groups of monomers (CS—N) and/or (CS—C) to react among each other.

The choice of the curing agent (A) is not particularly limited, and one of ordinary skills in the art will select the most suitable curing agent (A) depending on the nature of the cure sites of the fluoroelastomer (A).

One or more than one agent (A) can be used in the composition of the present invention. Notably, one or more than one agent (A) may be selected among those possessing a plurality of groups having reactivity towards the nitrile- and/or the carbo-groups of monomers (CS—N) and/or (CS—C), as above described; and one or more than one agent (A) may be selected among those activating catalytically the same nitrile- and/or the carbo-groups of monomers (CS—N) and/or (CS—C) to react among each other, and one or more than one of these two types of agents (A) can be used alone or in combination in the composition of the present invention.

When the agent (A) is selected among compounds possessing catalytic activity towards activation of nitrile- and/or the carbo-groups of monomers (CS—N) and/or (CS—C), as above described, the agent (A) is referred to as an agent $(A_{cat})$, and can be notably selected from the group consisting of:

- an organic ammonia-generating compound, that is to say a compound able to generate ammonia upon heating (e.g. in conditions such as those encountered during curing/post-cure);
- an organotin compound, such as notably allyl-propargyl-, triphenyl-, and allenyl-tin curatives, with tetraalkyl or tetraaryl tin compounds being preferred.

Agent $(A_{cat})$ is preferably selected from the group consisting of:

$(A_{cat}\text{-}1)$: (thio)urea compounds of formula (U) and salts thereof:

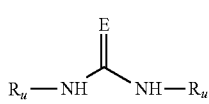

(U)

wherein E is O or S, preferably E is O, and each of $R_u$, equal to or different from each other, is independently selected from the group consisting of hydrogen and $C_1$-$C_6$ hydrocarbon groups (in particular $C_1$-$C_6$ alkyl groups);
$(A_{cat}\text{-}2)$: cyclic addition products of ammonia or primary amine and aldehyde;
$(A_{cat}\text{-}3)$: (thio)carbamates of formula (C):

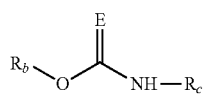

(C)

wherein E is oxygen or sulphur; $R_b$ is a $C_1$-$C_{36}$ hydrocarbon group, and Rc is H or a $C_1$-$C_6$ alkyl group; $(A_{cat}\text{-}4)$: ammonium salts of organic and inorganic acids, notably selected from the group consisting of (j) ammonium (preferably fluorine-containing) carboxylates; (jj) ammonium (preferably fluorine-containing) sulfonates; (jjj) ammonium (preferably fluorine alkyl group-containing) phosphates, phosphonates or sulfonates; (jv) ammonium salts of sulfuric acid, carbonic acid, nitric acid and phosphoric acid.

Among suitable agents $(A_{cat})$:

$(A_{cat}\text{-}1)$: (thio)urea compounds, as above detailed, are preferably selected from the group consisting of $(A_{cat}\text{-}1\text{-}A)$ (thio)ureas of formula (U-2):

(U2)

wherein E' is O or S;

$(A_{cat}\text{-}2)$: cyclic addition products of ammonia or primary amine and aldehyde, as above detailed, are preferably selected from the group consisting of:

$(A_{cat}\text{-}2\text{-}A)$ cyclic aldehyde adducts trimers of formula (T):

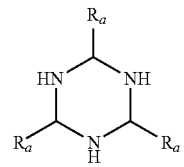

(T) wherein each of $R_a$, equal to or different from each other, is selected from the group consisting of hydrogen and $C_1$-$C_6$ hydrocarbon groups (in particular $C_1$-$C_6$ alkyl groups);

$(A_{cat}\text{-}2\text{-}B)$ hexamethylene tetramine of formula:

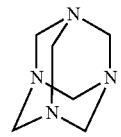

(which is known to be the result of addition of ammonia on formaldehyde);

$(A_{cat}\text{-}3)$: (thio)carbamates, as above detailed, are preferably selected from the group consisting of $(A_{cat}\text{-}3\text{-}A)$ carbamates of formula (C-1):

(C-1)

wherein $R'_d$ is a $C_1$-$C_{36}$ hydrocarbon group, preferably is a optionally substituted benzyl group.

Agents $(A_{cat})$ which have been found particularly useful in the composition of the present invention are the following:

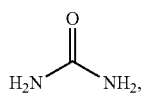

($A_{cat}$-1) Urea of formula:
which is the preferred option in terms of costs/availability/reactivity;

($A_{cat}$-2) Acetaldehyde ammonia trimer of formula:

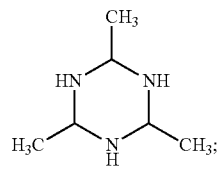

($A_{cat}$-3) Hexamethylenetetramine of formula:

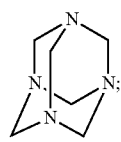

($A_{cat}$-4) Benzyl carbamate of formula:

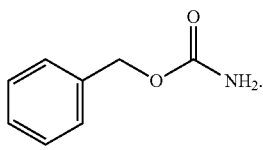 [SMILES: NC(=O)OCc1ccccc1]

When the agent (A) is selected among compounds possessing a plurality of groups having reactivity towards the nitrile- and/or the carbo-groups of monomers (CS—N) and/or (CS—C), as above described, the agent (A) is referred to as an agent ($A_{func}$), and can be notably selected from the group consisting of:

($A_{func}$-1) bis-amino(thio)phenol compounds [aminophenol (AP)] of formula:

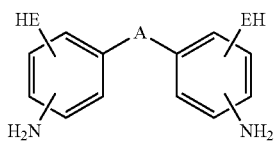

wherein:
A is a bond, —SO$_2$—, —O—, —C(O)—, or a (fluoro)alkyl of 1 to 10 carbon atoms (specifically a perfluoroalkyl of 1 to 10 carbon atoms, e.g. —C(CF$_3$)$_2$—);
each of E, equal of different at each occurrence, is oxygen or sulphur, preferably oxygen, and wherein the amino and -EH groups are interchangeably in ortho, meta or para positions with respect to the group A;

($A_{func}$-2) aromatic tetraamine compounds [amine (TA)] of formula:

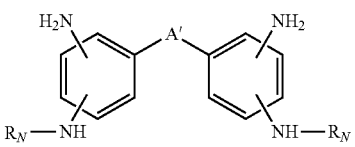

wherein:
A' is a bond, —SO$_2$—, —O—, —C(O)—, (fluoro)alkyl of 1 to 10 carbon atoms (specifically a perfluoroalkyl of 1 to 10 carbon atoms, e.g. —C(CF$_3$)$_2$—);
each of R$_N$, equal to or different from each other, is a hydrogen atom or a C$_1$-C$_{12}$ hydrocarbon group, preferably an aryl group; and
the amino groups are interchangeably in ortho, meta or para positions with respect to the group A', ($A_{func}$-3) bis-amidoxime/amidine/amidrazone compounds of formula:

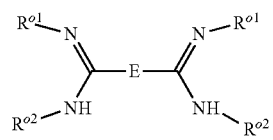

wherein R$_{a1}$ is —OH or —H, and R$_{a2}$ is H or NH$_2$, and E is a C$_1$-C$_{18}$ divalent group, optionally comprising fluorine atoms;

($A_{func}$-4) bis-imidoylamidine compounds of formula:

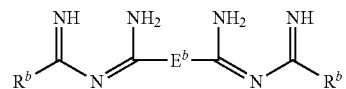

wherein E$^b$ is a C$_1$-C$_{18}$ divalent group, optionally comprising fluorine atoms, and R$^b$ is a C$_1$-C$_{12}$ group, optionally fluorinated.

Among bis-amidoxime/amidine/amidrazone compounds ($A_{func}$-3) as above detailed, mention can be notably made of:

($A_{func}$-3-A): fluorinated bis-amidoxime compounds of formula:

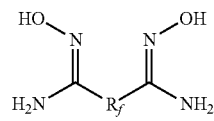

wherein R$_f$ is a divalent fluorinated alkylidene group, preferably a group of formula —(CF$_2$)$_n$—, with $n$ being 1 to 10, or wherein R$_f$ is a (per)fluorooxyalkylene group, preferably a group selected from —(CFX)$_p$(OCF$_2$CFX)$_n$(OCFX)$_m$O—(CFX)$_p$—, with X being F or —CF3; n, m being zero or integers, with the provisio that n+m is from 1 to 100; and m being 1 or 2.

($A_{func}$-3-B) aromatic bis-amidoxime compounds of formula:

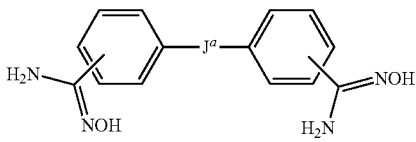

wherein $J^a$ is a bond, —SO₂—, —O—, —C(O)—, (fluoro)alkyl of 1 to 10 carbon atoms (specifically a perfluoroalkyl of 1 to 10 carbon atoms, e.g. C(CF₃)₂—);

($A_{func}$-3-C): fluorinated bis-amidrazone compounds of formula:

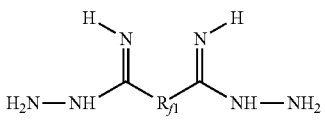

wherein $R_f$ is a divalent fluorinated alkylidene group, preferably a group of formula

—(CF₂)ₙ—, with n being 1 to 10, or wherein $R_f$ is a (per)fluorooxyalkylene group, preferably a group selected from —(CFX)$_p$(OCF₂CFX)$_n$(OCFX)$_m$O—(CFX)$_p$—, with X being F or —CF3; n, m being zero or integers, with the proviso that n+m is from 1 to 100; and m being 1 or 2.

($A_{func}$-3-D) aromatic bis-amidrazone compounds of formula:

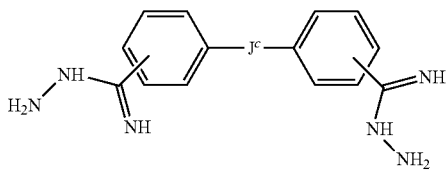

wherein $J^c$ is a bond, —SO₂—, —O—, —C(O)—, (fluoro)alkyl of 1 to 10 carbon atoms (specifically a perfluoroalkyl of 1 to 10 carbon atoms, e.g. —C(CF₃)₂—).

According to certain preferred embodiment's, agent (A) is an aminophenol (AP), as above detailed.

The aminophenol (AP) can be selected from the group consisting of 4,4'-[2,2,2-trifluoro-1-(trifluoromethyl)-ethylidene]bis(2-aminophenol); 4,4'-sulfonylbis(2-aminophenol); 3,3'-diaminobenzidine, 3,3',4,4'-tetraaminobenzophenone.

Particularly preferred aminophenol (AP) is 4,4'-[2,2,2-trifluoro-1-(trifluoromethyl)-ethylidene]bis(2-aminophenol), otherwise known as bis-aminophenol AF, having formula:

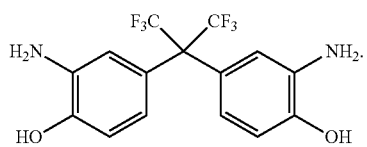 [SMILES: Nc1cc(C(c2ccc(O)c(N)c2)(C(F)(F)F)C(F)(F)F)ccc1O]

The composition (C) comprises one or more than one marker (B), as above detailed.

Without being bound by this theory, the Applicant has surprisingly found that marker (B), as above detailed, has the ability to react with the fluoroelastomer (A) as above detailed, without undergoing any significant evaporative loss or decomposition during molding, curing and post-curing, hence ensuring in final rubber parts molded from the composition of the invention the presence of bromine atoms, which can be easily detected through different analytical techniques, including notably mass spectrometry, if and when released in a certain environment, because e.g. of wear and/or material decomposition for whichever reason.

This is of particular advantage especially in semiconductors' manufacture, whereas fluoroelastomers are widely used as sealing materials, and wherein, from one side, conditions are extremely harsh and severe, including e.g. plasma radiation, HF and other etching gases exposure, and yet wherein extreme cleanness and absence of contaminants of whichever type, including wastes from damaged equipment's seals, is mandatory to meet quality standards.

As said, marker (B) comprises at least one bromine atom. Marker (B) may comprise one or more than one bromine atoms.

Generally, markers (B), as above detailed, wherein at least one bromine atom is bound to a sp²-hybridized aromatic carbon are preferred. Indeed, markers (B) wherein at least one bromine atom is bound to an aromatic moiety through said bond to an annular aromatic sp² hybridized carbon, thermal resistance of the said Br—C bond is enhanced, so that the release of bromine from composition (C) and/or from cured parts derived therefrom mainly and substantially intervene because of critical failure of the composition (C) and/or from cured parts derived therefrom.

As said, the composition (C) comprises one or more than one agent (A), and one or more than one marker (B), as above detailed, which comprises at least one Br atom and at least one group (B-1) to (B-6), as detailed above.

The skilled in the art recognizes that groups (B-1) to (B-6), as detailed above, are groups which are able to react with the nitrile groups or carbo-groups of fluoroelastomer (A); hence, for embodiments whereas marker (B) comprises more than one (e.g. two, or three, or more) group of (B-1) to (B-6) type, marker (B) may actually qualify as an agent (A), and more specifically as an agent ($A_{func}$), as above detailed.

Hence, while embodiments wherein agent (A) and marker (B) are different compounds are encompassed by the invention, it is still no deviation from the same using a marker (B) possessing more than one group of (B-1) to (B-6) type, in combination with no agent (A) different from marker (B).

When agent (A) is different from marker (B), the composition (C) comprises:
marker (B), as above detailed, in an amount of generally ranging from 0.10 to 10 phr, preferably of 0.25 to 5 phr, with respect to fluoroelastomer (A); and
agent (A), as above detailed, in an amount of ranging from 0.10 to 10 phr, preferably of 0.25 to 5 phr, with respect to fluoroelastomer (A).

When marker (B) is a compound possessing more than one group of (B-1) to (B-6) type, and qualifies in the composition (C) both as a marker (B) and as an agent (A), its amount is generally ranging from 0.20 to 10 phr, preferably of 0.3 to 6 phr, with respect to fluoroelastomer (A).

In connection with markers (B-1) as above detailed, the expression "aromatic ortho-diamine group" is used for designating a group comprising an aromatic cycle (which may be or may be not condensed to another aromatic or not aromatic cycle, which may have or may not bring substituents other than the amine groups, and which may be an aromatic heterocycle or may be free from annular atoms different from carbon) which possesses two amine groups directly bound to two annular aromatic sp² hybridized carbons which are in ortho position one in respect to the other.

Among markers comprising (B-1) aromatic ortho-diamine group, compounds comprising an ortho-diamine phenyl group of formula (B-1-a) below:

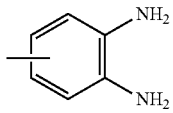

are particularly preferred.

Among those markers (B-1), compounds of particular use are notably those of formulae:

(B-1-i)

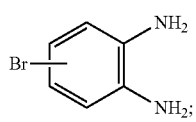
(B-1-i)

(B-1-ii)

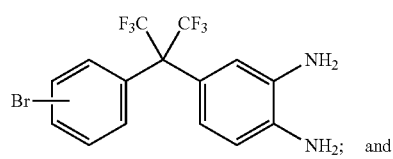
(B-1-ii)

(B-1-iii)

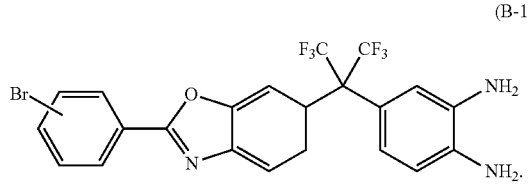
(B-1-iii)

A compound which has been found particularly effective is compound of formula (B-1-iv):

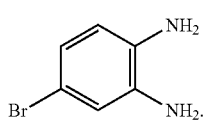
(B-1-iv)

Similarly, in connection with markers (B-2) as above detailed, the expression "aromatic ortho amino-(thio)phenolic-type groups" is used for designating a group comprising an aromatic cycle (which may be or may be not condensed to another aromatic or not aromatic cycle, which may have or may not bring substituents other than the amine and hydroxyl groups, and which may be an aromatic heterocycle or may be free from annular atoms different from carbon), which possesses an amine group and a hydroxyl groups directly bound to two annular aromatic sp² hybridized carbons which are in ortho position one in respect to the other.

Among markers comprising (B-2) aromatic ortho amino-(thio)phenolic-type groups, compounds comprising an amino-(thio)phenol group of formula (B-2-a):

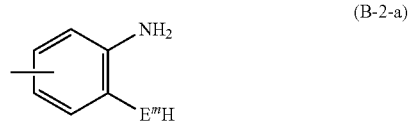
(B-2-a)

with $E'''$ being O or S, are particularly preferred.

Among those markers (B-2), compounds of particular use are notably those of formulae:

(B-2-i)

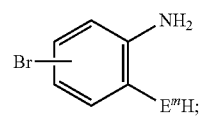
(B-2-i)

(B-2-ii)

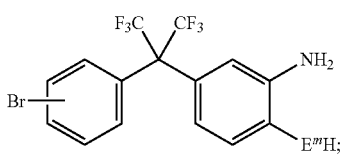
(B-2-ii)

(B-2-iii)

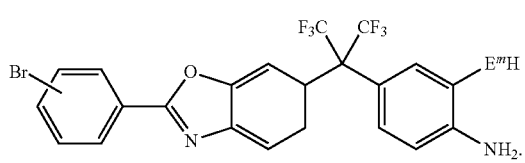
(B-2-iii)

Compounds of (B-2)-type which have been found particularly effective are compounds of formula (B-2-iv) and (B-2-v):

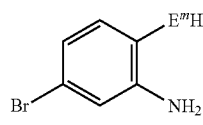
(B-2-iv)

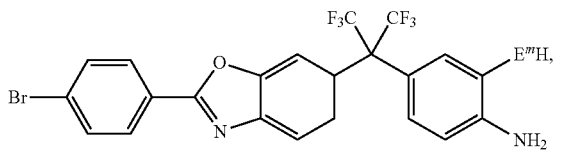
(B-2-v)

with E''' being E''' being O or S; and more specifically compounds of formula (B-2-vi) and (B-2-vii):

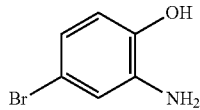
(B-2-vi)

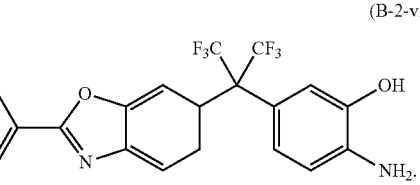
(B-2-vii)

Markers (B-3) comprising amidoxime/amidine/amidrazone groups of formula:

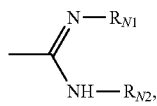

wherein $R_{N1}$ is —OH or —H, and $R_{N2}$ is H or $NH_2$, are generally selected from the group consisting of compounds comprising a group of formula:

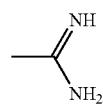

and compounds comprising a group of formula:

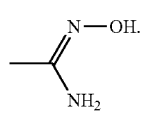

Compounds of (B-3)-type which have been found particularly effective are compounds of formula:

(B-3-i)

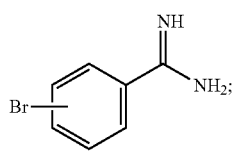

(B-3-ii)

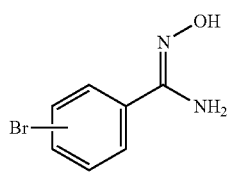

(B-3-iii)

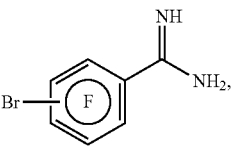

wherein the symbol

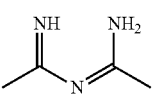

associated with the aromatic ring, is intended to mean that all free valences of the aromatic ring are substituted with fluorine atoms;

(B-3-iv)

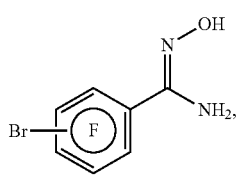

wherein the symbol

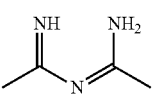

associated with the aromatic ring, is intended to mean that all free valences of the aromatic ring are substituted with fluorine atoms.

Markers (B-4) comprising imidoylamidine groups of formula:

are generally selected from the group consisting of compounds (B-4-i)

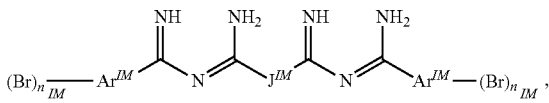

wherein $Ar^{IM}$ is an aromatic group, possibly fluorinated; $J^{IM}$ is a $C_1$-$C_{18}$ divalent group, possibly fluorinated, possibly comprising ethereal oxygen atoms, such as e.g., a fluorooxyalkylene chain; $n_{IM}$ is an integer from 1 to 4;

(B-4-ii)

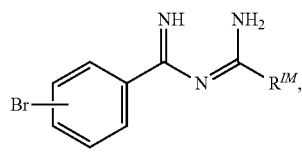
(B-4-ii)

wherein $R^{IM}$ is a $C_1$-$C_{12}$ group, possibly fluorinated:

(B-4-iii)

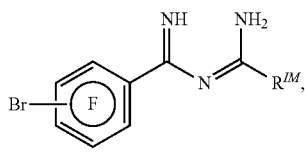
(B-4-iii)

wherein $R^{IM}$ is a $C_1$-$C_{12}$ group, possibly fluorinated.

Markers (B-5) comprising azide groups, as above detailed, are generally selected from the group consisting of:

(B-5-i)

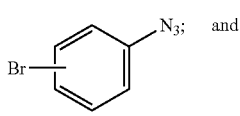
(B-5-i) and (B-5-ii)

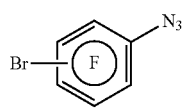
(B-5-iii)

wherein the symbol

, associated with the aromatic ring, is intended to mean that all free valences of the aromatic ring are substituted with fluorine atoms.

Markers (B-6) comprising imidine groups of formula

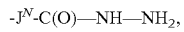
-$J^N$-C(O)—NH—NH$_2$, wherein $J^N$ is either a bond, an ester oxygen —O— group, or an amine —NH— group, are generally selected from the group consisting of:

-(B-6-i)

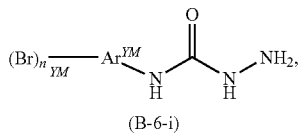
(B-6-i)

wherein $n_{YM}$ is an integer of 1 to 4, $Ar^{YM}$ is an aromatic group, possibly fluorinated;

-(B-6-ii)

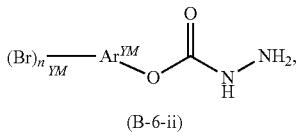
(B-6-ii)

wherein $n_{YM}$ is an integer of 1 to 4, $Ar^{YM}$ is an aromatic group, possibly fluorinated;

-(B-6-iii)

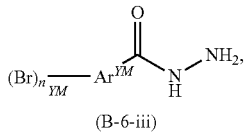
(B-6-iii)

wherein $n_{YM}$ is an integer of 1 to 4, $Ar^{YM}$ is an aromatic group, possibly fluorinated.

Compounds of (B-6)-type which have been found particularly effective are compounds of formula:

-(B-6-iv)

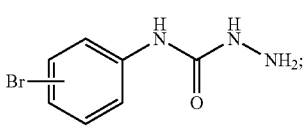
(B-6-iv)

-(B-6-v)

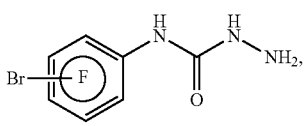
(B-6-v)

wherein the symbol

, associated with the aromatic ring, is intended to mean that all free valences of the aromatic ring are substituted with fluorine atoms;

-(B-6-vi)

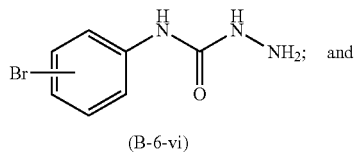

(B-6-vi)

-(B-6-vii)

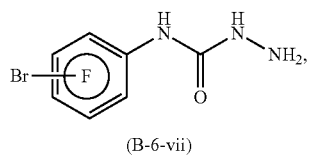

(B-6-vii)

wherein the symbol

associated with the aromatic ring, is intended to mean that all free valences of the aromatic ring are substituted with fluorine atoms.

The composition (C) comprises one or more than one fluoroelastomer (A), as above detailed.

For the purposes of this invention, the term "(per)fluoroelastomer" [fluoroelastomer (A)] is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, (per)fluorinated monomer) and, optionally, recurring units derived from at least one ethylenically unsaturated monomer free from fluorine atom (hereafter, hydrogenated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Generally fluoroelastomer (A) comprises recurring units derived from at least one (per)fluorinated monomer, in addition to recurring units derived from monomer (CS—N) and/or (CS—C), as above detailed, wherein said (per)fluorinated monomer is generally selected from the group consisting of:

$C_2$-$C_8$ fluoro- and/or perfluoroolefins, such as tetrafluoroethylene (TFE), hexafluoropropene (HFP), pentafluoropropylene, and hexafluoroisobutylene;

$C_2$-$C_8$ hydrogenated monofluoroolefins, such as vinyl fluoride; 1,2-difluoroethylene, vinylidene fluoride (VDF) and trifluoroethylene (TrFE);

(per)fluoroalkylethylenes complying with formula $CH_2$=CH—$R_{f0}$, in which $R_{f0}$ is a $C_1$-$C_6$ (per)fluoroalkyl or a $C_1$-$C_6$ (per)fluorooxyalkyl having one or more ether groups;

chloro- and/or bromo- and/or iodo-$C_2$-$C_6$ fluoroolefins, like chlorotrifluoroethylene (CTFE);

fluoroalkylvinylethers complying with formula $CF_2$=CFOR$_{f1}$ in which $R_{f1}$ is a $C_1$-$C_6$ fluoro- or perfluoroalkyl, e.g. —$CF_3$, —$C_2F_5$, —$C_3F_7$;

hydrofluoroalkylvinylethers complying with formula $CH_2$=CFOR$_{f1}$ in which $R_{f1}$ is a $C_1$-$C_6$ fluoro- or perfluoroalkyl, e.g. —$CF_3$, —$C_2F_5$, —$C_3F_7$;

fluoro-oxyalkylvinylethers complying with formula $CF_2$=CFOX$_0$, in which $X_0$ is a $C_1$-$C_{12}$ oxyalkyl, or a $C_1$-$C_{12}$ (per)fluorooxyalkyl having one or more ether groups; in particular (per)fluoro-methoxy-vinylethers complying with formula $CF_2$=CFOCF$_2$OR$_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ (per)fluorooxyalkyl having one or more ether groups, like —$C_2F_5$—O—$CF_3$;

functional fluoro-alkylvinylethers complying with formula $CF_2$=CFOY$_0$, in which $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;

(per)fluorodioxoles, of formula:

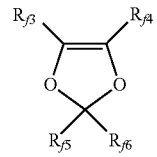

wherein each of $R_{f3}$, $R_{f4}$, $R_{f5}$, $R_{f6}$, equal to or different from each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Examples of hydrogenated monomers are notably hydrogenated alpha-olefins, including ethylene, propylene, 1-butene, diene monomers, styrene monomers, alpha-olefins being typically used.

Fluoroelastomers (A) are in general amorphous products or products having a low degree of crystallinity (crystalline phase less than 20% by volume) and a glass transition temperature ($T_g$) below room temperature. In most cases, the fluoroelastomer (A) has advantageously a $T_g$ below 10° C., preferably below 5° C., more preferably 0° C.

The fluoroelastomer (A) is preferably selected among:

(1) VDF-based copolymers, in which VDF is copolymerized with monomer (CS—N) and/or monomer (CS—C), as above detailed, and at least one additional comonomer selected from the group consisting of:

(a) $C_2$-$C_8$ perfluoroolefins, such as tetrafluoroethylene (TFE), hexafluoropropylene (HFP);

(b) hydrogen-containing $C_2$-$C_8$ olefins, such as vinyl fluoride (VF), trifluoroethylene (TrFE), hexafluoroisobutene (HFIB), perfluoroalkyl ethylenes of formula

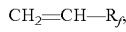

wherein $R_f$ is a $C_1$-$C_6$ perfluoroalkyl group;

(c) $C_2$-$C_8$ fluoroolefins comprising at least one of iodine, chlorine and bromine, such as chlorotrifluoroethylene (CTFE);

(d) (per)fluoroalkylvinylethers (PAVE) of formula

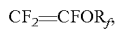

wherein $R_f$ is a $C_1$-$C_6$ (per)fluoroalkyl group, preferably $CF_3$, $C_2F_5$, $C_3F_7$;

(e) (per)fluoro-oxy-alkylvinylethers of formula

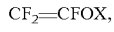

wherein X is a $C_1$-$C_{12}$ ((per)fluoro)-oxyalkyl comprising catenary oxygen atoms, e.g. the perfluoro-2-propoxypropyl group;

(f) (per)fluorodioxoles having formula:

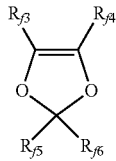

wherein each of $R_{f3}$, $R_{f4}$, $R_{f5}$, $R_{f6}$, equal to or different from each other, is independently selected from the group consisting of fluorine atom and $C_1$-$C_6$ (per)fluoroalkyl groups, optionally comprising one or more than one oxygen atom, such as notably —$CF_3$, —$C_2F_5$, —$C_3F_7$, —$OCF_3$, —$OCF_2CF_2OCF_3$; preferably, perfluorodioxoles;

(g) (per)fluoro-methoxy-vinylethers (MOVE, hereinafter) having formula: $CF_2$=$CFOCF_2OR_{f2}$ wherein $R_{f2}$ is selected from the group consisting of $C_1$-$C_6$ (per)fluoroalkyls; $C_5$-$C_6$ cyclic (per)fluoroalkyls; and $C_2$-$C_6$ (per)fluorooxyalkyls, comprising at least one catenary oxygen atom; $R_{f2}$ is preferably —$CF_2CF_3$ (MOVE1); —$CF_2CF_2OCF_3$ (MOVE2); or —$CF_3$ (MOVE3);

(h) $C_2$-$C_8$ non-fluorinated olefins (OI), for example ethylene and propylene; and (2) TFE-based copolymers, in which TFE is copolymerized with monomer (CS—N) and/or monomer (CS—C), as above detailed, and at least one additional comonomer selected from the group consisting of (c), (d), (e), (g), (h) and (i) as above detailed.

Fluoroelastomer (A) is generally selected among TFE-based copolymers, as above detailed.

Optionally, fluoroelastomer (A) of the present invention may also comprises recurring units derived from a bis-olefin [bis-olefin (OF)] having general formula

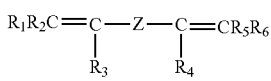

wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ (hydro)carbon radical (including alkylene or cycloalkylene radical), optionally containing oxygen atoms, preferably at least partially fluorinated, or a (per)fluoro(poly)oxyalkylene radical comprising one or more catenary ethereal bonds.

The bis-olefin (OF) is preferably selected from the group consisting of those complying with formulae (OF-1), (OF-2) and (OF-3): (OF-1)

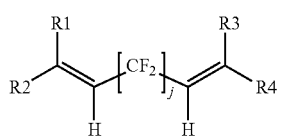

wherein j is an integer between 2 and 10, preferably between 4 and 8, and R1, R2, R3, R4, equal or different from each other, are H, F or $C_{1-5}$ alkyl or (per)fluoroalkyl group;

(OF-2)

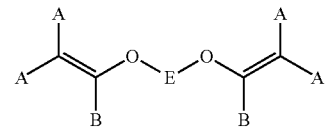

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$— group, with m being an integer from 3 to 5; a preferred bis-olefin of (OF-2) type is $F_2C$=$CF$—$O$—$(CF_2)_5$—$O$—$CF$=$CF_2$.

(OF-3)

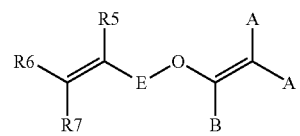

wherein E, A and B have the same meaning as above defined; R5, R6, R7, equal or different from each other, are H, F or $C_{1-5}$ alkyl or (per)fluoroalkyl group.

Among cure-site containing monomers of type (CS—N), as above detailed, comprised in fluoroelastomer (A), preferred monomers are (per)fluorinated and are especially those selected from the group consisting of: (CS—N1) perfluorovinyl ethers containing nitrile groups of formula

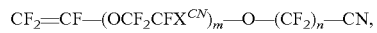

with $X^{CN}$ being F or $CF_3$, m being 0, 1, 2, 3 or 4; n being an integer from 1 to 12;

(CS—N2) perfluorovinyl ethers containing nitrile groups of formula

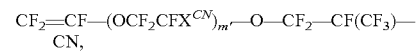

with $X^{CN}$ being F or $CF_3$, m' being 0, 1, 2, 3 or 4.

Specific examples of cure-site containing monomers of type CS—N1 and CS—N2 suitable to the purposes of the present invention are notably those described in U.S. Pat. No. 4,281,092 (DU PONT) Jul. 28, 1981, U.S. Pat. No. 4,281,092 (DU PONT) Jul. 28, 1981, U.S. Pat. No. 5,447,993 (DU PONT) Sep. 5, 1995 and U.S. Pat. No. 5,789,489 (DU PONT) Aug. 4, 1998.

Preferred cure-site monomer (CS—N) is perfluoro(8-cyano-5-methyl-3,6-dioxa-1-octene) of formula:

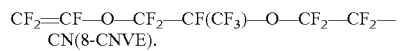

Among cure-site containing monomers of type (CS—C), as above detailed, comprised in fluoroelastomer (A), preferred monomers are (per)fluorinated and are especially those selected from the group consisting of: (CS—C1) perfluorovinyl ethers containing carbo-groups of formula

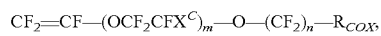

with $X^C$ being F or $CF_3$, m being 0, 1, 2, 3 or 4; n being an integer from 1 to 12, and $R_{COX}$ being selected from the group consisting of carboxylic groups —COOH; carboxylate groups —$COOX_a$, with $X_a$ being a monovalent metal or an ammonium group; carboxamide group —$CONH_2$; and alkoxycarboxylic group —COO—$R_H$, with $R_H$ being a (fluoro)(hydro)carbon group, preferably a $C_1$-$C_3$ alkyl group; (CS—C2) perfluorovinyl ethers containing carbogroups of formula $$CF_2=CF-(OCF_2CFX^C)_{m'}-O-CF_2-CF(CF_3)-R_{COX},$$

with m' being 0, 1, 2, 3 or 4, and $X^C$ and $R_{COX}$ having the meaning as defined for (CSC-1).

It is nevertheless generally preferred for fluoroelastomer (A) to comprise recurring units derived from cure-site containing monomers of type (CS—N), as above detailed, i.e. for fluoroelastomer (A) to be a nitrile-curable compound.

Exemplary preferred fluoroelastomers (A) which can be used in the composition of the present invention are those having following monomers composition (in mol %, with respect to the total moles of recurring units): (i) tetrafluoroethylene (TFE): 50-80%; (per)fluoroalkylvinylethers (PAVE): 15-50%; monomer (CS—N): 0.1-10%; bis-olefin (OF): 0-5%;
(ii) tetrafluoroethylene (TFE): 20-70%; (per)fluoromethoxy-vinylethers (MOVE): 25-75%; (per)fluoroalkylvinylethers (PAVE): 0-50%; monomer (CS—N) 0.1-10%; bis-olefin (OF): 0-5%.

The composition (C) may further additionally comprise ingredients which may be commonly used for curing of fluoroelastomers; more specifically, composition (C) may generally further comprise (a) one or more than one metallic basic compound, in amounts generally of from 0.5 to 15 phr, and preferably of from 1 to 10 phr, relative to 100 weight parts of fluoroelastomer (A); metallic basic compounds are generally selected from the group consisting of (j) oxides or hydroxides of divalent metals, for instance oxides or hydroxides of Mg, Zn, Ca or Pb, and (jj) metal salts of a weak acid, for instance Ba, Na, K, Pb, Ca stearates, benzoates, carbonates, oxalates or phosphites;

(b) one or more than one acid acceptor which is not a metallic basic compound, in amounts generally of from 0.5 to 15 phr, and preferably of from 1 to 10 phr, relative to 100 weight parts of fluoroelastomer (A); these acid acceptors are generally selected from nitrogen-containing organic compounds, such as 1,8-bis(dimethylamino)naphthalene, octadecylamine, etc., as notably described in EP 708797 A (DU PONT) May 1, 1996;

(c) other conventional additives, such as fillers, thickeners, pigments, antioxidants, stabilizers, processing aids, and the like.

Among fillers, fluorinated reinforcing fillers consisting of fluoroplastic, in particular of nanometric size, can be advantageously used. Hence, the composition of the invention, according to certain embodiments, may comprise at least one semi-crystalline fluoropolymer, generally in an amount of from 10 to 70 weight parts, preferably from 12 to 60 weight parts, relative to 100 weight parts of fluoroelastomer (A); the said semi-crystalline fluoropolymer is generally selected from the group consisting of tetrafluoroethylene (TFE) homopolymers and copolymers of TFE with one or more monomers containing at least one unsaturation of ethylenic type, in an amount of from 0.01 to 10 mol % and preferably from 0.05 to 7 mol %. Within this frame, particularly preferred are semi-crystalline TFE copolymers comprising recurring units derived from at least one (per) fluoroalkylvinylethers (PAVE) of formula $$CF_2=CFOR_f,$$

wherein $R_f$ is a $C_1$-$C_6$ (per)fluoroalkyl group, preferably $CF_3$, $C_2F_5$, $C_3F_7$. From morphological perspective, the semi-crystalline fluoropolymers preferred for these embodiment's are those which possess an average particle size of between 10 and 400 nm, preferably of 10 to 250 nm, even more preferably of 10 to 100 nm.

The invention also pertains to a method for fabricating shaped articles comprising curing the composition (C), as above described.

The composition (C) can be fabricated, e.g. by moulding (injection moulding, extrusion moulding), calendering, or extrusion, into the desired shaped article, which is advantageously subjected to vulcanization (curing) during the processing itself and/or in a subsequent step (post-treatment or post-cure), advantageously transforming the relatively soft, weak, fluoroelastomeric uncured composition into a finished article made of non-tacky, strong, insoluble, chemically and thermally resistant cured fluoroelastomer material.

Yet, the invention pertains to cured articles obtained from the composition (C), as above detailed. Said cured articles are generally obtained by moulding and curing the fluoroelastomer composition, as above detailed. These cured articles may be sealing articles, including O(square)-rings, packings, gaskets, diaphragms, shaft seals, valve stem seals, piston rings, crankshaft seals, cam shaft seals, and oil seals or may be piping and tubings, in particular flexible hoses or other items, including conduits for delivery of hydrocarbon fluids and fuels.

Further in addition, the invention pertains to a method for processing the composition (C), as above detailed, according any of injection moulding, compression moulding, extrusion moulding, coating, screen printing technique, form-in-place technique.

Further in addition, the invention pertains to a method for detecting wear/failures in cured articles, as above detailed, said method comprising monitoring release of bromine-containing compounds originating from said wear/failures.

Techniques for monitoring release of bromine-containing compounds are not particularly limited, and can be based on standard analytical techniques. Mass spectrometry is particularly adapted for detecting bromine-containing compounds, thanks to the peculiar double peak associated to ions losing a bromine atom.

Should the disclosure of any of the patents, patent applications, and publications that are incorporated herein by reference conflict with the present description to the extent that it might render a term unclear, the present description shall take precedence.

The present invention will be now described in more detail with reference to the following examples, whose purpose is merely illustrative and not limitative of the scope of the invention.

Raw Materials

Bis-aminophenol AF (BOAP, herein after) was supplied from Apollo Scientific and used as received.

2-amino-4-bromophenol (ABP, herein after) of formula:

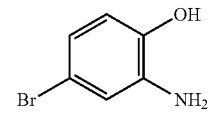

was supplied from Apollo Scientific and used as received.

3-bromobenzamidine hydrochloride (BBA, herein after) of formula:

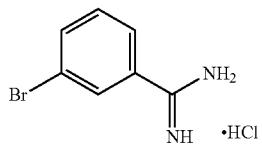

was supplied from Fluorochem and used as received.

3-bromobenzonitrile (BBN, herein after) of formula:

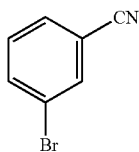

was supplied from Sigma Aldrich and used as received.

4-bromo-tetrafluorobenzonitrile (BFBN, herein after) of formula:

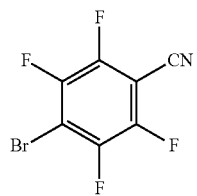

was supplied from Apollo Scientific and used as received.

PREPARATIVE EXAMPLE 1

Manufacture of an Elastomer Comprising Nitrile Groups

In a 5 litres reactor equipped with a mechanical stirrer operating at 630 rpm, 3.1 l of demineralized water and 31 ml of a microemulsion, previously obtained by mixing 7.4 ml of a perfluoropolyoxyalkylene having acidic end groups of formula:

$$CF_2ClO(CF_2-CF(CF_3)O)_n(CF_2O)_mCF_2COOH,$$

wherein n/m=10, having average molecular weight of 600, 1.9 ml of a 30% v/v $NH_4OH$ aqueous solution, 17.4 ml of demineralised water and 4.3 ml of GALDEN® D02 perfluoropolyether of formula:

$$CF_3O(CF_2CF(CF_3)O)_n(CF_2O)_mCF_3 \text{ with } n/m=20,$$

having average molecular weight of 450, were introduced.

The reactor was heated and maintained at a set-point temperature of 80° C.; a mixture of tetrafluoroethylene (TFE) (35% moles) and perfluoromethylvinylether (MVE) (64.3% moles) and ethane (0.7% moles, chain transfer agent) was then added to reach a final pressure of 21 bar (2.1 MPa). 0.31 g of ammonium persulfate (APS) as initiator were then introduced. Pressure was maintained at set-point of 21 bar by continuous feeding of a gaseous mixture of TFE (57.5% moles) and MVE (42.5% moles) up to a total of 1350 g, and 129 g of 8-CNVE in 20 portions each 5% increase in conversion, starting from the beginning of the polymerization, were fed to the reactor. Moreover, 0.16 g of APS at 15%, 40% and 55% conversion of gaseous mixture, were introduced. Then the reactor was cooled, vented and the latex recovered. The latex was coagulated with nitric acid as a coagulation agent, and the polymer separated from the aqueous phase, washed with demineralised water and dried in a convection oven at 120° C. for 24 hours.

The composition of the obtained polymer from NMR analysis was found to be: TFE 60.8% mol, MVE 38.0% mol, 8-CNVE 1.2% mol, and the Mooney viscosity at 121° C. is 50 MU.

General Compounding and Curing Procedure

The fluoroelastomer of preparative Ex. 1 was compounded with the ingredients as detailed below in a two rolls open mill. Plaques were cured in a pressed mould and then post-treated in an air circulating oven in conditions detailed in Table below.

Cure behaviour was characterized by Moving Die Rheometer (MDR), at 170° C., by determining the following properties:

$M_L$=Minimum torque (lb×in)
MH=Maximum torque (lb×in)
$t_{s2}$=Scorch time, time for two units rise from $M_L$ (sec);
$t_{02}$=Time to 2% state of cure (sec);
$t_{50}$=Time to 50% state of cure (sec);
$t_{90}$=Time to 90% state of cure (sec);
$t_{95}$=Time to 95% state of cure (sec).

The tensile properties have been determined on specimens punched out from the plaques, according to the ASTM D 412 C Standard, after post-cure and after exposure to overheated water vapour at 220° C. or 250° C.

TS is the tensile strength in MPa;
$M_{50}$ is the modulus in MPa at an elongation of 50%;
$M_{100}$ is the modulus in MPa at an elongation of 100%;
E. B. is the elongation at break in %.

Compression set (CS) values have been determined on O-rings (#214 class) according to the ASTM D 395-B method at temperatures ranging from 200° C. to 300° C.; values in the table are the average of determinations made on 4 specimens.

Procedures similar to those described for Ex. 1 herein above were repeated for all other working and non-working embodiments, whose compositional and characterization features are summarized in the Tables below.

TABLE 1

| Ingredient | | Ex. 2 | Ex. 3C | Ex. 4 | Ex. 5C | Ex. 6C | Ex. 7 |
|---|---|---|---|---|---|---|---|
| FKM from Ex. 1 | Wt parts | 100 | 100 | 100 | 100 | 100 | 100 |
| BOAP | phr | 0.7 | 0.7 | — | — | — | 1 |
| ABP | phr | 0.50 | — | — | — | — | 1 |
| BBA | phr | — | — | 1 | — | — | — |
| urea | phr | — | — | 0.5 | 0.25 | 0.25 | — |
| BBN | phr | — | — | — | 3 | — | — |
| BFBN | phr | — | — | — | — | 3 | — |

TABLE 2

| Sample | | Ex. 2 | Ex. 3C | Ex. 4 | Ex. 5C | Ex. 6C | Ex. 7 |
|---|---|---|---|---|---|---|---|
| $M_L$ | (Nxm) | 0.4 | 0.4 | 0.3 | 0.3 | 0.3 | 0.4 |
| $M_H$ | (Nxm) | 9.4 | 10.5 | 7.9 | 8.8 | 8.5 | 8.7 |
| $t_{s2}$ | (s) | 329.0 | 243.0 | 186.0 | 96.0 | 98.0 | 453 |
| $t_{02}$ | (s) | 120.0 | 105.0 | 68.0 | 51.0 | 51.0 | 121 |
| $t_{50}$ | (s) | 408.0 | 332.0 | 351.0 | 144.0 | 157.0 | 545 |

TABLE 2-continued

| Sample | | Ex. 2 | Ex. 3C | Ex. 4 | Ex. 5C | Ex. 6C | Ex. 7 |
|---|---|---|---|---|---|---|---|
| $t_{90}$ | (s) | 567.0 | 758.0 | 1107.0 | 726.0 | 863.0 | 698 |
| $t_{95}$ | (s) | 630.0 | 988.0 | 1289.0 | 1161.0 | 1227.0 | 827 |
| Molding Conditions | | | | | | | |
| Time and T in the press | | 10 min at 170° C. | | | | | |
| Post-cure conditions in air oven | | | | | | | |
| Conditions | | (8 + 16 h) at 290° C. | | | | | |

Bromine Content Determination

Content of Br was determined by XRF (i) after compounding the elastomer with the ingredients listed in table 1, (ii) after curing/molding; (iii) after post-cure at 290° C., in conditions as detailed above. Results are summarized in the following table.

TABLE 3

| Br content | | Ex. 2 | Ex. 4 | Ex. 5C | Ex. 6C | Ex. 7 |
|---|---|---|---|---|---|---|
| After compounding | | | | | | |
| Br | (% wt) | 0.21 | 0.31 | 1.28 | 0.92 | 0.31 |
| After molding | | | | | | |
| Br | (% wt) | 0.21 | 0.31 | 0.29 | 0.83 | 0.31 |
| After post-cure at 290° C. | | | | | | |
| Br | (% wt) | 0.16 | 0.16 | 0 | 0 | 0.28 |

Data comprised in Table below demonstrate that the presence of the bromine-containing reactive marker is not detrimentally affecting the mechanic and sealing properties of compound comprising the same.

TABLE 4

| Property | | Ex. 2 | Ex. 3C | Ex. 7 |
|---|---|---|---|---|
| Properties after post-cure | | | | |
| TS | (MPa) | 6.0 | 7.9 | 8.0 |
| $M_{50}$ | (MPa) | 0.8 | 0.8 | 0.82 |
| $M_{100}$ | (MPa) | 1.2 | 1.4 | 1.3 |
| E.B. | (%) | 243 | 217 | 276 |
| Hardness | (Shore A) | 52 | 52 | 53 |
| C-Set (70 h @ 200° C.) | (%) | 11 | 8 | 12 |
| C-Set (70 h @ 300° C.) | (%) | 33 | | 37 |

Bromine Detection Via Mass Spectrometry

Specimens of Ex. 2 and Ex. 3C were submitted to thermogravimetric analysis, coupled with mass spectrometry on-line analysing the off-gases from TGA. At temperatures approaching 450° C., mass spectrometry detected for off-gases generated by specimen Ex. 2 significant intensity associated to couples of peaks with a gap of 2 m/z units between them and with almost equal heights (e.g. at 265 and 267 m/z), while no m/z couple of this type in same spectral regions was spotted in off-gases from TGA on Ex. 3C. This is a demonstration that mass spectrometry is able to selectively spot critical failure of cured materials including bromine markers, through identification of peaks which are peculiar to the presence of Bromine.

The invention claimed is:

1. A fluoroelastomer composition (C), said composition (C) comprising:
at least one fluoroelastomer (A), wherein fluoroelastomer (A) comprises from 0.1 to 10.0% moles, with respect to total moles of recurring units of fluoroelastomer (A), of recurring units derived from at least one of:
cure-site containing monomers having at least a nitrile group [monomer (CS—N)];
at least one curing agent [agent (A)];
at least one bromine-containing marker [marker (B)], selected from the group consisting of compounds comprising at least one Br atom and at least one group selected from:
(B-1) aromatic ortho-diamine groups;
(B-2) aromatic ortho amino-(thio)phenolic groups;
(B-3) amidoxime/amidine/amidrazone groups of formula:

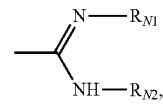

wherein $R_{N1}$ is —OH or —H, and $R_{N2}$ is H or $NH_2$;
(B-4) imidoylamidine groups of formula:

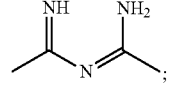

(B-5) azide groups of formula:

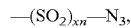

wherein xn is 0 or 1; and
(B-6) carbazide groups of formula

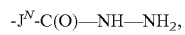

wherein $J^N$ is either a bond, an ester oxygen —O— group, or an amine —NH— group.

2. The composition (C) according to claim 1, wherein the agent (A) is selected from compounds possessing catalytic activity towards activation of nitrile-group monomers (CS—N), and wherein the agent (A) is referred to as an agent ($A_{cat}$), and is selected from the group consisting of:
an organic ammonia-generating compound, able to generate ammonia upon; and
an organotin compound.

3. The composition according to claim 2, wherein the agent ($A_{cat}$) is selected from the group consisting of:
($A_{cat}$-1): (thio)urea compounds of formula (U) and salts thereof:

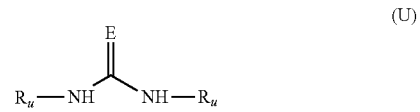

wherein E is O or S, and each of $R_u$, equal to or different from each other, is independently selected from the group consisting of hydrogen and $C_1$-$C_6$ hydrocarbon groups;

($A_{cat}$-2): cyclic addition products of ammonia or primary amine and aldehyde;
($A_{cat}$-3): (thio)carbamates of formula (C):

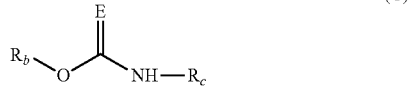
(C)

wherein E is oxygen or sulphur; $R_b$ is a $C_1$-$C_{36}$ hydrocarbon group, and Rc is H or a $C_1$-$C_6$ alkyl group; and
($A_{cat}$-4): ammonium salts of organic and inorganic acids.

4. The composition (C) according to claim 3, wherein agent ($A_{cat}$) is selected from the group consisting of:
($A_{cat}$-1-A) (thio)ureas of formula (U-2):

(U2)

wherein E' is O or S;
($A_{cat}$-2-A) cyclic aldehyde adducts trimers of formula (T):

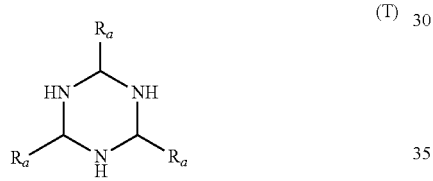
(T)

wherein each of $R_a$, equal to or different from each other, is selected from the group consisting of hydrogen and $C_1$-$C_6$ hydrocarbon groups;
($A_{cat}$-2-B) hexamethylene tetramine of formula:

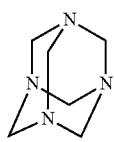

($A_{cat}$-3-A) carbamates of formula (C-1):

(C-1)

wherein $R'_d$ is a $C_1$-$C_{36}$ hydrocarbon group.

5. The composition according to claim 3, wherein the agent ($A_{cat}$-4) is selected from the group consisting of (j) ammonium carboxylates optionally containing fluorine; (jj) ammonium sulfonates optionally containing fluorine; (jjj) ammonium phosphates optionally containing one or more fluorine-alkyl groups, phosphonates or sulfonates; (jv) ammonium salts of sulfuric acid, carbonic acid, nitric acid and phosphoric acid.

6. The composition (C) according to claim 2, wherein the organotin compound is selected from the group consisting of allyl-propargyl-, triphenyl-, and allenyl-tin curatives, and tetraalkyl or tetraaryl tin compounds.

7. The composition (C) of claim 1, wherein the agent (A) is selected from compounds possessing a plurality of groups having reactivity towards the nitrile-group monomers (CS—N) and wherein the agent (A) is referred to as an agent ($A_{func}$), and is selected from the group consisting of:
($A_{func}$-1) bis-amino(thio)phenol compounds [aminophenol (AP)] of formula:

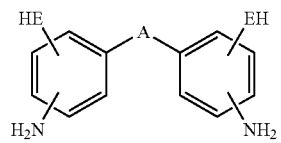

wherein:
A is a bond, —$SO_2$—, —O—, —C(O)—, or a (fluoro)alkyl of 1 to 10 carbon atoms;
each of E, equal of different at each occurrence, is oxygen or sulphur, and wherein the amino and -EH groups are interchangeably in ortho, meta or para positions with respect to the group A;
($A_{func}$-2) aromatic tetraamine compounds [amine (TA)] of formula:

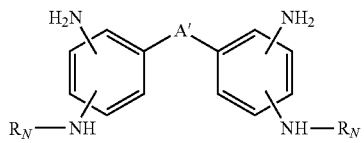

wherein:
A' is a bond, —$SO_2$—, —O—, —C(O)—, (fluoro)alkyl of 1 to 10 carbon atoms;
each of $R_N$, equal to or different from each other, is a hydrogen atom or a $C_1$-$C_{12}$ hydrocarbon group; and
the amino groups are interchangeably in ortho, meta or para positions with respect to the group A',
($A_{func}$-3) bis-amidoxime/amidine/amidrazone compounds of formula:

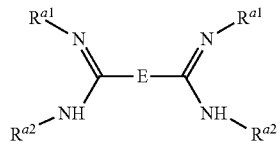

wherein $R_{a1}$ is —OH or —H, and $R_{a2}$ is H or $NH_2$, and E is a $C_1$-$C_{18}$ divalent group, optionally comprising fluorine atoms; and
($A_{func}$-4) bis-imidoylamidine compounds of formula:

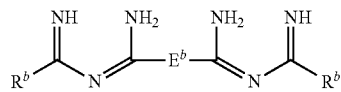

wherein $E^b$ is a $C_1$-$C_{18}$ divalent group, optionally comprising fluorine atoms, and $R^b$ is a $C_1$-$C_{12}$ group, optionally fluorinated.

8. The composition (C) according to claim 7, wherein the agent ($A_{func}$) is 4,4'—[2,2,2-trifluoro-1-(trifluoromethyl)-ethylidene]bis(2-aminophenol), otherwise known as bis-aminophenol AF, having formula:

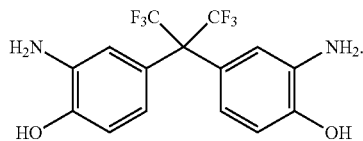 [SMILES: Nc1cc(C(c2ccc(O)c(N)c2)(C(F)(F)F)C(F)(F)F)ccc1O]

9. The composition (C) according to claim 7, wherein agent (A) is agent ($A_{func}$-1), A is —C(CF$_3$)$_2$- and each of E, equal of different at each occurrence, is oxygen; or agent (A) is agent ($A_{func}$-2), A' is —C(CF$_3$)$_2$—, and each of $R_N$, equal to or different from each other, is an aryl group.

10. The composition (C) according to claim 1, wherein marker (B) is a marker (B-1) comprising at least one aromatic ortho-diamine group, and is selected from the group consisting of:

-(B-1-i)

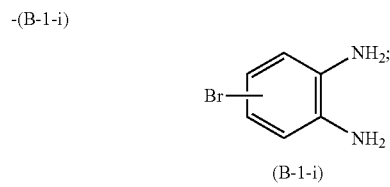

(B-1-i)

-(B-1-ii)

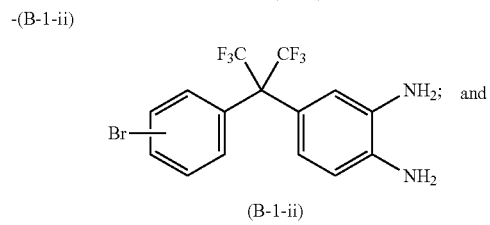

(B-1-ii)

-(B-1-iii)

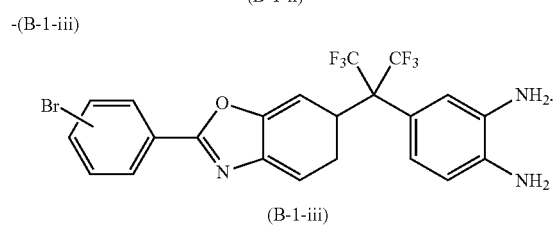

(B-1-iii)

11. The composition (C) according to claim 1, wherein marker (B) is a marker (B-2) comprising at least one aromatic ortho amino-(thio)phenolic group, and is selected from the group consisting of compounds of formulae:

-(B-2-i)

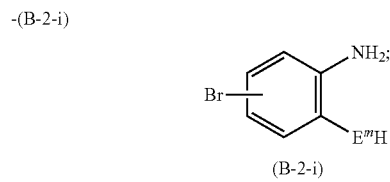

(B-2-i)

-(B-2-ii)

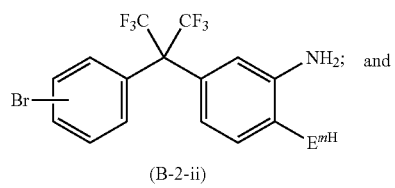

(B-2-ii)

-(B-2-iii)

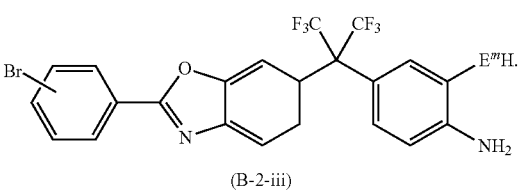

(B-2-iii)

wherein $E^m$ is oxygen or sulphur.

12. The composition (C) according to claim 1, wherein marker (B) is a marker (B-3) comprising amidoxime/amidine/amidrazone groups of formula:

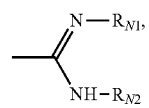

wherein $R_{N1}$ is —OH or —H, and $R_{N2}$ is H or NH$_2$, and is selected from the group consisting of compounds of formula:

-(B-3-i)

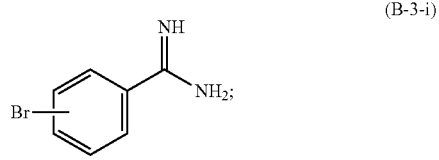

(B-3-i)

-(B-3-ii)

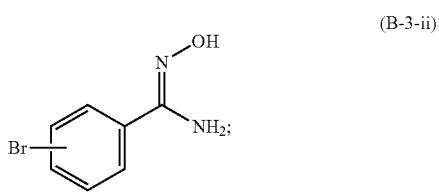

(B-3-ii)

-(B-3-iii)

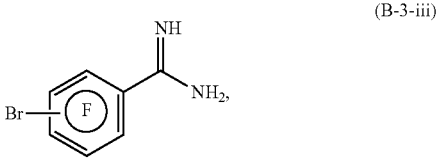

(B-3-iii)

wherein the symbol

associated with the aromatic ring, is intended to mean that all free valences of the aromatic ring are substituted with fluorine atoms; and -(B-3-iv)

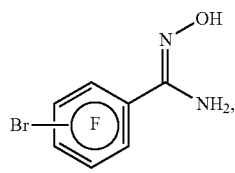

(B-3-iv)

wherein the symbol

associated with the aromatic ring, is intended to mean that all free valences of the aromatic ring are substituted with fluorine atoms.

13. The composition (C) according to claim 1, wherein marker (B) is a marker (B-4) comprising at least one imidoylamidine group of formula:

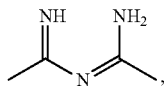

and is selected from the group consisting of compounds

-(B-4-i)

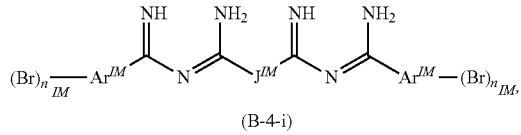

(B-4-i)

wherein $Ar^{IM}$ is an aromatic group, optionally fluorinated; $J^{IM}$ is a $C_1$-$C_{18}$ divalent group, optionally fluorinated, optionally comprising ethereal oxygen atoms, $n_{IM}$ is an integer from 1 to 4;

-(B-4-ii)

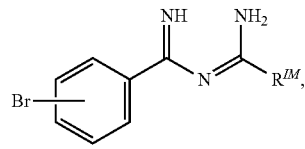

(B-4-ii)

wherein $R^{IM}$ is a $C_1$-$C_{12}$ group, optionally fluorinated; and

-(B-4-iii)

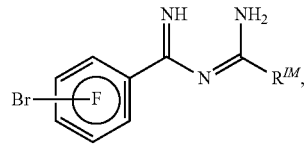

(B-4-iii)

wherein $R^{IM}$ is a $C_1$-$C_{12}$ group, optionally fluorinated.

14. The composition (C) according to claim 1, wherein marker (B) is a marker (B-5) comprising at least one azide group, and is selected from the group consisting of:

-(B-5-i)

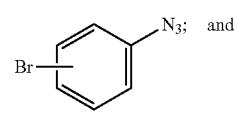

(B-5-i)

-(B-5-ii)

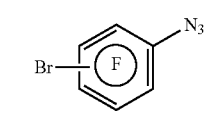

(B-5-iii)

wherein the symbol

associated with the aromatic ring, is intended to mean that all free valences of the aromatic ring are substituted with fluorine atoms.

15. The composition (C) according to claim 1, wherein marker (B) is a marker (B-6) comprising at least one imidine group of formula

-$J^N$-C(O)—NH—NH$_2$, wherein $J^N$ is either a bond, an ester oxygen —O—group, or an amine —NH—group, and is selected from the group consisting of:

-(B-6-i)

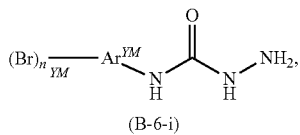

(B-6-i)

wherein $n_{YM}$ is an integer of 1 to 4, $Ar^{YM}$ is an aromatic group, optionally fluorinated;

-(B-6-ii)

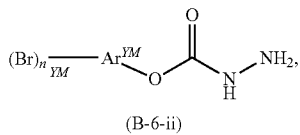

(B-6-ii)

wherein $n_{YM}$ is an integer of 1 to 4, $Ar^{YM}$ is an aromatic group, optionally fluorinated; and -(B-6-iii)

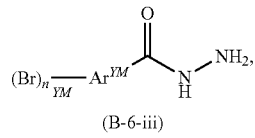

(B-6-iii)

wherein $n_{YM}$ is an integer of 1 to 4, $Ar^{YM}$ is an aromatic group, optionally fluorinated.

16. The composition (C) according to claim 1, wherein the cure-site containing monomer of type (CS—N) is selected from the group consisting of:

(CS—N1) perfluorovinyl ethers containing nitrile groups of formula $$CF_2=CF-(OCF_2CFX^{CN})_m-O-(CF_2)_n-CN,$$

with $X^{CN}$ being F or $CF_3$, m being 0, 1, 2, 3 or 4; n being an integer from 1 to 12; and (CS—N2) perfluorovinyl ethers containing nitrile groups of formula $$CF_2=CF-(OCF_2CFX^{CN})_{m'}-O-CF_2-CF(CF_3)-CN,$$

with $X^{CN}$ being F or $CF_3$, m' being 0, 1, 2, 3 or 4.

17. A method for fabricating a shaped article, said method comprising curing the composition (C) according to claim 1.

18. A cured article obtained from the composition (C) according to claim 1, said cured article being a sealing article, an O(square)-ring, a packing, a gasket, a diaphragm, a shaft seal, a valve stem seal, a piston ring, a crankshaft seal, a cam shaft seal, and an oil seal, piping, or tubing.

19. A method for detecting wear/failures in the cured article of claim 18, said method comprising monitoring release of bromine-containing compounds originating from said wear/failures.

* * * * *